Feb. 23, 1954     J. H. CHADBOURNE     2,669,754
MANUFACTURE OF COMPOSITE WIRE AND ROPE
Filed Nov. 26, 1947
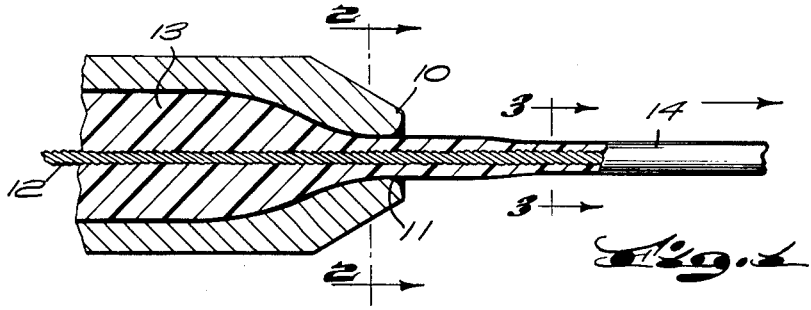
Fig. 1
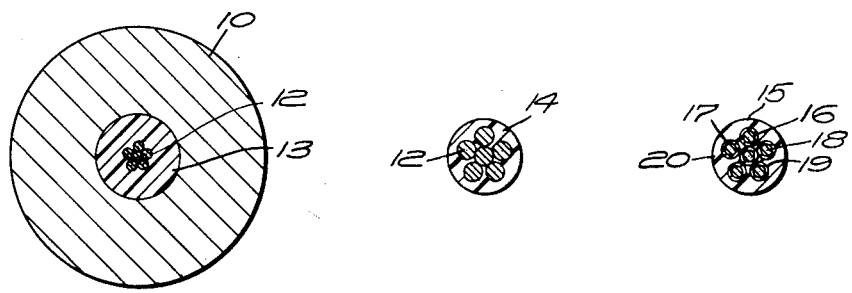
Fig. 2     Fig. 3     Fig. 4
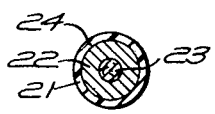     
Fig. 5     Fig. 6
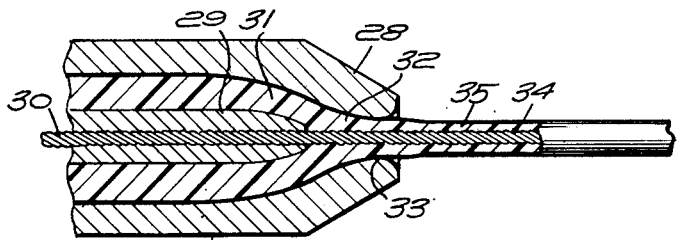
Fig. 7
Inventor
Joseph H. Chadbourne
Nathaniel Frucht
By
Attorney

UNITED STATES PATENT OFFICE 2,669,754

MANUFACTURE OF COMPOSITE WIRE AND ROPE

Joseph H. Chadbourne, Danielson, Conn., assignor to The Danielson Manufacturing Company, a corporation of Connecticut Application November 26, 1947, Serial No. 788,252

8 Claims. (Cl. 18—59)

The present invention relates to the manufacture of composite wire and rope, and has particular reference to a composite construction of wire and rope and plastic.

The principal object of the invention is to provide an improved process for manufacturing wire and rope comprising integrally joined metallic cores and thermo-plastic sheaths.

Another object of the invention is to provide an apparatus for integrally anchoring an oriented sheath of nylon to a metallic core.

A further object is to provide novel wire and rope having great resistance to strain and flexing.

With the above and other objects and advantageous features in view, the invention consists of a novel method and a novel arrangement of parts more fully disclosed in the detailed description following, in conjunction with the accompanying drawings, and more specifically defined in the claims appended thereto.

In the drawings:

Fig. 1 is an elongated sectional view through a portion of an extension device for integrally joining a plastic sheath and a metallic core;

Fig. 2 is an enlarged section on the line 2—2 of Fig. 1;

Fig. 3 is an enlarged section on the line 3—3 of Fig. 1;

Fig. 4 is an enlarged section similar to Fig. 3, and showing a modified core arrangement;

Figs. 5 and 6 are views similar to Fig. 3, showing further modified constructions; and Fig. 7 is a longitudinal sectional view of a modified extrusion device of the type of Fig. 1.

It has been found desirable to provide wire and rope having great resistance to tension strains and to flexing, and provided with smooth, abrasive resistant and oil and water proof outer surfaces. To this end I have devised a composite construction which utilizes a metallic core of wire or of rope, to which a plastic covering, preferably of oriented nylon, is integrally joined.

This construction is particularly suitable for heavy duty subjected to flexing, such as for elevator cable use. Such cables are subjected to high speed operation for carrying heavy weights and are continually flexed over pulleys of relatively small diameters. Such elevator cables become set when made of non-preformed wire, to relieve internal strains and conform to the diameters of the pulleys, but the cable strands slip and chafe against each other. I have found it desirable to integrate an oriented nylon covering with the cable so as to form a composite rope in which the nylon holds the core strands in set arrangement adjusted to the work the cable is doing and to the particular working conditions, while at the same time the smooth outer surface prevents abrasion, prevents change in the set of the strands, permanently seals initial strand lubricant, prevents slippage and chafing, and eliminates corrosion and oxidation.

Tests of a cable having seven strands, nineteen wires to a strand, disclose that a composite cable having an overall diameter of .219 inch failed after 531,000 reversals, whereas a bare rope of identical construction to the core of the composite cable failed after 201,000 reversals.

The integration of oriented plastic and metallic core is of especial value for brake and speedometer cable use. The cables for automotive use move through fixed or flexible tubes which collect dirt, grit and oil, and gradually jam and finally break the cable; the provision of a smooth integrally joined covering reduces the jamming and very substantially increases the effective operation and the life of the cable. A composite cable of small diameter is particularly suitable for use for cord tire manufacture, as the integral nylon covering is compatible to rubber and serves to anchor the cable in the wire.

Another difficulty found in heavy duty cable constructions occurs in tow wires such as are utilized for towing target sleeves on airplanes. These cables are subject to heavy air drag when in the air, to loading with grit and dirt when dragged on the ground, and to bird-caging when directly hit. Further, the oil or lubricant between the cable strands has been found to cause dangerous explosions when the target was under fire. The integral covering has been found to materially cut air drag, has prevented loading of the cable with grit and dirt, as it is easily wiped off, has permanently sealed the cable lubricant in, and has eliminated bird-caging. Further, the smooth outer surface has resulted in greater effective life, as the eye ring which is attached to the target freely slides down the cable to the cable end stop without cutting or abrading the cable. In addition, the composite cable is easily and quickly spliced.

I have found that the most suitable plastic for use in composite wire and rope is oriented nylon, which may be applied by drawing a core through an orifice at high speed while extruding the nylon around the core, and by extruding the nylon in the form of a tube and drawing the wire at high speed through the tube, whereby the extruded nylon is oriented and integrally anchored on the core as it leaves the extrusion device. I have found that a core speed which stretches the extruded nylon will orient the nylon, and that virtually complete orientation is obtained by providing a four time stretch of the extruding nylon.

I have further found that the nylon, which is a thermoplastic of the amide-polymer type, is preferably modified by the addition of no less than 10% and not more than 25% by weight of a suitable plasticizer, depending on the desired softness or hardness of the outer surface of the composite article, 15% being desired for average conditions. The plasticizer I have found suitable is commercially sold under the trade name "Santicizer," and has a formula

A nylon formula found suitable is

I have further determined that the thickness of the nylon sheath for a particular cable diameter has a definite ratio to pulley diameter, for greatest life and resistance to flexing. For example, a composite cable with a .093" core and outside diameter of .121", wore six times as long as a .093" metal cable; when the outside diameter was increased, it did not wear as well over a pulley. However, where the essential requirement is increased resistance to impact and to fatigue, then thicker outer diameters, with more nylon, have been found desirable, as the nylon surface is resilient and elastomeric.

Referring to the drawings, Fig. 1 is an elongated sectional view through a portion of an illustrative extrusion device, comprising an extrusion die 10 having a restricted orifice 11. A wire or rope core 12 is drawn through the die and heated nylon 13 in plastic stage is extruded around the core, the nylon and the core becoming integrally joined as they leave the die. The core is drawn through at a speed sufficient to stretch the plastic nylon which shrinks slightly to firmly lock with the core and becomes oriented as it passes from the die, whereby the nylon is completely oriented closely adjacent the die, the resulting composite cable 14 having a metallic core and a smooth outer surface of oriented nylon.

For certain uses it is desirable to form the composite cable from composite strands, each of which have been initially composited with nylon before stranding, whereby the resulting composite cable 15, see Fig. 4, includes a core 16 of composite strands 17 each having a metallic core 18 and a nylon surface 19, the cable 15 having an over-all nylon surface 20. For other uses, a composite cable 21, see Fig. 5, may include a metallic core 22 having a non-metallic center 23, for example of textile material, and an outer nylon surface 24; or the metallic core may be omitted for special cables to provide a composite cable 25 which has a non-metallic core 26 and a nylon surfacing 27 anchored thereto as shown in Fig. 6.

It has also been found desirable to extrude the nylon as a tube about the core, the nylon anchoring to the core as it leaves the die. This arrangement is shown in Fig. 7, wherein the die 28 has an annular mandrel 29 through which a core 30 passes, at relatively high speed, the plastic nylon 31 in the die forming an annular tube 32 which locks to the core at the outlet orifice 33 of the die, whereby the composite cable 34 includes the core 30 and an oriented surfacing 35 which in shrinking as it leaves the die anchors itself and integrally locks to the core.

The above described composite wire and rope and the method and apparatus disclosed are illustrative, the invention comprising the manufacture of a composite integral unit in which the core and the oriented surfacing have substantially the same strength, are permanently locked together, and do not separate under adverse high or low temperature conditions, tension, or flexing. Although surfacing material other than nylon may be used, plasticized nylon has been found most suitable for the manufacture of a composite unit which has great strength, great resistance to flexing, and a smooth oil, water and dirt resistant surface.

Although I have described a specific embodiment of the invention, it is obvious that changes in the size and shape of the parts may be made without departing from the spirit and the scope of the invention as defined in the appended claims.

I claim:

1. In the manufacture of composite wire and cable, the steps of drawing a core at high speed through an extruding die having a flow chamber with a narrowing restricted orifice and extruding a thermoplastic material of the amido polymer type heated to the plastic state around the core and in contact with the core as it passes from the die to form a surfacing therefor, the speed of the core through the die being greater than the speed of flow of the thermoplastic material through the die to stretch the material by the rapidly moving core while the material is still in a plastic state, whereby a lock bond between the surfacing and the core results.

2. In the manufacture of composite wire and cable, the steps of drawing a core at high speed through an extruding die having a flow chamber with a narrowing restricted orifice and extruding a plasticized nylon heated to the plastic state around the core and in contact with the core as it passes from the die to form a surfacing therefore, the speed of the core through the die being greater than the speed of flow of the plasticized nylon through the die to stretch the plasticized nylon by the rapidly moving core while the material is still in a plastic state, whereby a lock bond between the surfacing and the core results.

3. In the method of claim 1, said core being a cable of flexible metal strands.

4. In the method of claim 2, said core being a cable of flexible metal strands.

5. The article made by the process of claim 1.
6. The article made by the process of claim 2.
7. The article made by the process of claim 3.
8. The article made by the process of claim 4.

JOSEPH H. CHADBOURNE.

References Cited in the file of this patent

UNITED STATES PATENTS

| Number | Name | Date |
| --- | --- | --- |
| 1,937,104 | Thomsen | Nov. 28, 1933 |
| 1,992,678 | Studt et al. | Feb. 26, 1935 |
| 2,265,436 | Loblein | Dec. 9, 1941 |
| 2,278,350 | Graves | Mar. 31, 1942 |
| 2,291,670 | Wiley et al. | Aug. 4, 1942 |
| 2,308,638 | Balthis et al. | Jan. 19, 1943 |
| 2,317,811 | Scheiber | Apr. 23, 1943 |
| 2,348,536 | Gordon | May 9, 1944 |
| 2,386,818 | Seavey | Oct. 16, 1945 |